(12) United States Patent
Tatsuta et al.

(10) Patent No.: US 9,979,229 B2
(45) Date of Patent: May 22, 2018

(54) POWER SUPPLY APPARATUS

(71) Applicant: Panasonic Corporation, Osaka (JP)

(72) Inventors: Toshiki Tatsuta, Tokyo (JP); Osamu Ohashi, Kanagawa (JP); Tsuyoshi Nishio, Chiba (JP); Noriaki Asaoka, Kanagawa (JP); Masayoshi Koizumi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 873 days.

(21) Appl. No.: 14/387,460

(22) PCT Filed: Mar. 7, 2013

(86) PCT No.: PCT/JP2013/001474
§ 371 (c)(1),
(2) Date: Sep. 23, 2014

(87) PCT Pub. No.: WO2013/145579
PCT Pub. Date: Oct. 3, 2013

(65) Prior Publication Data
US 2015/0102664 A1 Apr. 16, 2015

(30) Foreign Application Priority Data
Mar. 28, 2012 (JP) .................. 2012-073709

(51) Int. Cl.
H04B 3/00 (2006.01)
H04B 15/00 (2006.01)
(Continued)

(52) U.S. Cl.
CPC ............ H02J 17/00 (2013.01); B60L 11/182 (2013.01); H02J 5/005 (2013.01); H02J 7/025 (2013.01);
(Continued)

(58) Field of Classification Search
CPC .. H01F 38/00; H01F 38/14; H02J 7/00; H02J 7/02; H02J 17/00; B60L 1/00
(Continued)

(56) References Cited

U.S. PATENT DOCUMENTS 5,256,969 A * 10/1993 Miyajima .......... G01R 33/3854
324/300
9,130,386 B2 * 9/2015 Kawano .................. H02J 5/005
(Continued)

FOREIGN PATENT DOCUMENTS

JP 04175442 A * 6/1992
JP 2010-178499 A 8/2010
(Continued)

OTHER PUBLICATIONS

Supplementary European Search Report for Application No. 13767286.1 dated Feb. 26, 2015.
(Continued)

Primary Examiner — Jared Fureman
Assistant Examiner — Jagdeep Dhillon
(74) Attorney, Agent, or Firm — Pearne & Gordon LLP

(57) ABSTRACT

In the power supply apparatus (100), on an upper surface (202a), which is the surface opposing the power-receiving unit (153) of a cabinet (103b), in the portion where a power supply coil (103a) is projected when the power supply coil (103a) is projected on the cabinet (103b) toward the direction of the power-receiving unit (153), a first inclined part (203) gradually approaching the power supply coil (103a) from the top section (205) toward the inner edge section (211) of the power supply coil (103a) is formed in the radial direction of the power supply coil (103a), and in the portion where the power supply coil (103a) is projected, a second inclined part (204) gradually approaching the power supply coil (103a) from the top section (205) toward the outer periphery (212) of the power supply coil (103a) is formed in the radial direction of the power supply coil (103a).

5 Claims, 6 Drawing Sheets

(51) Int. Cl.
   *H05K 9/00*    (2006.01)
   *H02J 17/00*   (2006.01)
   *B60L 11/18*   (2006.01)
   *H02J 7/02*    (2016.01)
   *H02J 5/00*    (2016.01)
   *H02J 50/10*   (2016.01)
   *H02J 50/80*   (2016.01)
   *H02J 50/12*   (2016.01)
   *H02J 7/00*    (2006.01)

(52) U.S. Cl.
   CPC .............. *H02J 50/10* (2016.02); *H02J 50/80* (2016.02); *H02J 50/12* (2016.02); *H02J 2007/0096* (2013.01); *Y02T 10/7005* (2013.01); *Y02T 10/7072* (2013.01); *Y02T 90/122* (2013.01); *Y02T 90/14* (2013.01)

(58) Field of Classification Search
   USPC ........ 307/104, 149, 108, 9.1, 10.1; 320/108, 320/109, 110, 107; 336/84 C
   See application file for complete search history.

(56) References Cited

U.S. PATENT DOCUMENTS

| | | | |
|---|---|---|---|
| 2004/0175971 A1* | 9/2004 | Terashima | H01R 13/629 439/83 |
| 2007/0100255 A1* | 5/2007 | Boecker | A61B 5/14532 600/583 |
| 2010/0156346 A1* | 6/2010 | Takada | B60L 11/182 320/108 |
| 2010/0201204 A1* | 8/2010 | Sakoda | H02J 5/005 307/104 |
| 2011/0074346 A1 | 3/2011 | Hall et al. | |
| 2011/0254376 A1* | 10/2011 | Sasaki | B60L 5/005 307/104 |
| 2012/0038317 A1* | 2/2012 | Miyamoto | H02J 7/025 320/108 |
| 2012/0161535 A1* | 6/2012 | Jung | H01F 38/14 307/104 |
| 2012/0200151 A1* | 8/2012 | Obayashi | B60L 11/123 307/9.1 |
| 2012/0203410 A1 | 8/2012 | Wechlin et al. | |
| 2012/0242447 A1* | 9/2012 | Ichikawa | B60L 11/182 336/84 C |

FOREIGN PATENT DOCUMENTS

| | | |
|---|---|---|
| JP | 2010-226946 A | 10/2010 |
| JP | 2011-010435 A | 1/2011 |
| WO | 2011/006884 A2 | 1/2011 |

OTHER PUBLICATIONS

International Search Report for Application No. PCT/JP2013/001474 dated May 21, 2013.

* cited by examiner

POWER SUPPLY APPARATUS

TECHNICAL FIELD

The present invention relates to an electric supply apparatus that contactlessly supplies electric power using electromagnetic induction to an electric reception section provided in a vehicle.

BACKGROUND ART

A typical known contactless electric supply apparatus is one that is placed on a ground surface and supplies electric power to an electric reception section mounted in a vehicle (for example, Patent Literature (hereinafter, abbreviated as PTL) 1).

In PTL 1, two units, i.e., an electric transmission unit and an electric reception section are provided. The electric transmission unit includes a ring-shaped electric transmission coil and a casing that houses this coil, and is placed on a road surface side position where a vehicle stops, such as a parking space. The electric reception section includes a ring-shaped electric reception coil and a casing that houses this coil, and is placed on the bottom surface of the vehicle at a position that faces the electric transmission unit placed on the ground surface. The surface of the casing that faces the electric reception section of the electric transmission unit (hereinafter referred to as "upper surface") is formed so as to be in parallel with the radial direction of the electric transmission coil.

CITATION LIST

Patent Literature

PTL 1
Japanese Patent Application Laid-Open No. 2011-10435

SUMMARY OF INVENTION

Technical Problem

In the electric supply apparatus according to the related art, however, it is likely that a foreign object is put on the upper surface of the electric transmission unit because the surface of the electric transmission unit is in parallel with the radial direction of the transmission coil. The foreign object on the upper surface involves a problem in that the foreign object is heated to a high temperature by a magnetic flux penetrating the foreign object during electric supply. Moreover, the foreign object heated to a high temperature may cause, for example, a hole at a portion in contact with the foreign object and damage the upper surface. Consequently, the foreign object or the like entering from the damaged portion may affect the electric supply process of the electric transmission coil.

It is an object of the present invention to provide an electric supply apparatus that can prevent a foreign object from being heated to a high temperature during electric supply.

Solution to Problem

An electric supply apparatus according to an aspect of the present invention is an apparatus that contactlessly supplies electric power using electromagnetic induction to an electric reception section provided in a vehicle, the apparatus including: a ring-shaped electric supply coil that faces the electric reception section and that supplies electric power to the electric reception section; and a casing that houses the electric supply coil, wherein the casing includes a first incline portion, a second incline portion, and a recessed portion on an upper surface of the casing, the upper surface being a surface facing the electric reception section: the first incline portion being formed in a portion of the upper surface where the electric supply coil is projected when the electric supply coil is projected on the casing toward the electric reception section, and gradually approaching the electric supply coil from a top portion on the upper surface toward an inner edge portion of the electric supply coil in a radial direction of the electric supply coil; the second incline portion being formed in the portion of the upper surface where the electric supply coil is projected, and gradually approaching the electric supply coil from the top portion toward an outer circumference of the electric supply coil in the radial direction of the electric supply coil; and a recessed portion being in contact with an end portion of the first incline portion located in a direction different from the top portion.

Advantageous Effects of Invention

According to the present invention, it is possible to prevent a foreign object from being heated to a high temperature during electric supply.

DESCRIPTION OF EMBODIMENTS

Hereafter, an embodiment of the present invention will be described in detail with reference to the accompanying drawings.

Figure 1:
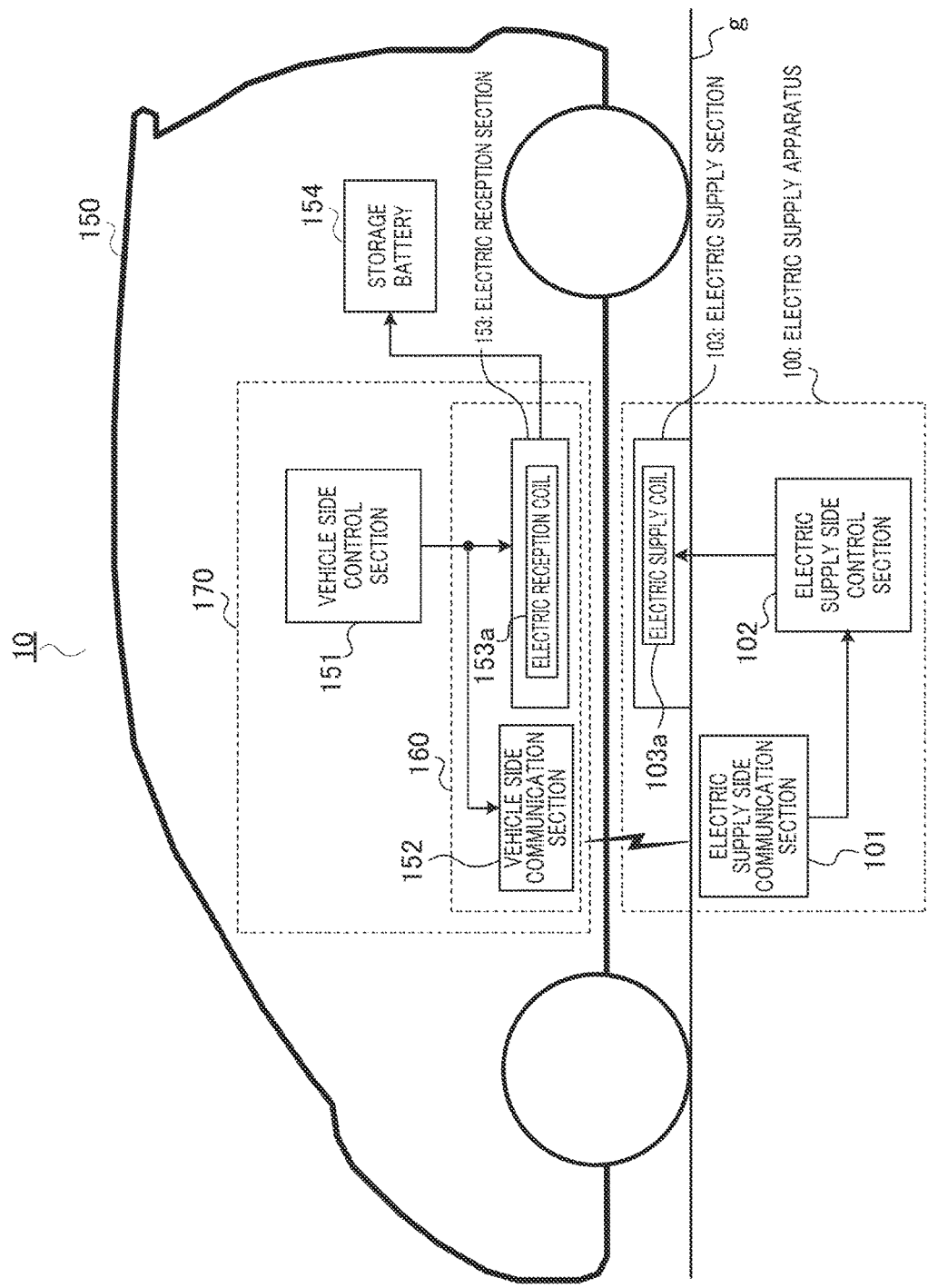
FIG. 1 is a block diagram illustrating an example of the configuration of a charging system according to Embodiment 1 of the present invention.

(Embodiment 1)
<Configuration of Charging System>
FIG. 1 is a block diagram illustrating an example of the configuration of charging system 10 in Embodiment 1 of the present invention.

Charging system 10 includes electric supply apparatus 100, vehicle 150, storage battery 154, and charging apparatus 170.

Electric supply apparatus 100 is placed on a ground surface or buried so that electric supply section 103 is exposed from land surface g. Electric supply apparatus 100 is provided, for example, in a parking space and supplies electric power to charging apparatus 170 while facing electric reception section 153, during parking of vehicle 150. The configuration of electric supply apparatus 100 will be described below.

Vehicle 150 includes storage battery 154 and charging apparatus 170, and runs with storage battery 154 as a power source. Vehicle 150 is, for example, an automobile that can run with the electric power of storage battery 154 such as an HEV (Hybrid Electric Vehicle), a PHEV (Plug-in Hybrid Electric Vehicle), or an EV (Electric Vehicle).

Storage battery 154 stores the electric power supplied from charging apparatus 170.

Charging apparatus 170 includes vehicle side control section 151 and electric reception apparatus 160, and supplies the electric power supplied from electric supply apparatus 100, to storage battery 154. The configuration of charging apparatus 170 will be described below in detail.

Vehicle side control section 151 controls electric reception apparatus 160 to perform various processes associated with charging or various processes associated with the stop of charging.

Electric reception apparatus 160 supplies the electric power supplied from electric supply apparatus 100, to storage battery 154 according to the control of vehicle side control section 151. The configuration of electric reception apparatus 160 will be described below.

<Configuration of Electric Supply Apparatus>

Electric supply apparatus 100 includes electric supply side communication section 101, electric supply side control section 102, and electric supply section 103.

Electric supply side communication section 101 receives an electric supply start signal or an electric supply stop signal from vehicle side communication section 152. Electric supply side communication section 101 outputs the received electric supply start signal or electric supply stop signal to electric supply side control section 102.

Electric supply side control section 102 controls electric supply section 103 to start electric supply according to the electric supply start signal inputted from electric supply side communication section 101. Electric supply side control section 102 controls electric supply section 103 to stop electric supply according to the electric supply stop signal inputted from electric supply side communication section 101.

Electric supply section 103 includes electric supply coil 103a. Electric supply section 103 supplies the current having a predetermined frequency to electric supply coil 103a according to the control of electric supply side control section 102 to thereby supply electric power using electromagnetic induction to electric reception section 153. This electric supply is performed in an electromagnetic induction system or a magnetic resonance system, for example. The configuration of electric supply section 103 will be described below in detail.

<Configuration of Electric Reception Apparatus>

Electric reception apparatus 160 includes vehicle side communication section 152 and electric reception section 153.

Vehicle side communication section 152 generates a charging start signal or a charging stop signal according to control of vehicle side control section 151, and transmits the generated charging start signal or charging stop signal to electric supply side communication section 101.

Electric reception section 153 is provided at the bottom portion of vehicle 150. Electric reception section 153 includes electric reception coil 153a and contactlessly faces electric supply section 103 when storage battery 154 is charged. Electric reception section 153 supplies the electric power, which is supplied from electric supply section 103 to electric reception coil 153a, to storage battery 154 according to the control of vehicle side control section 151.

<Configuration of Electric Supply Section>

Figure 2:
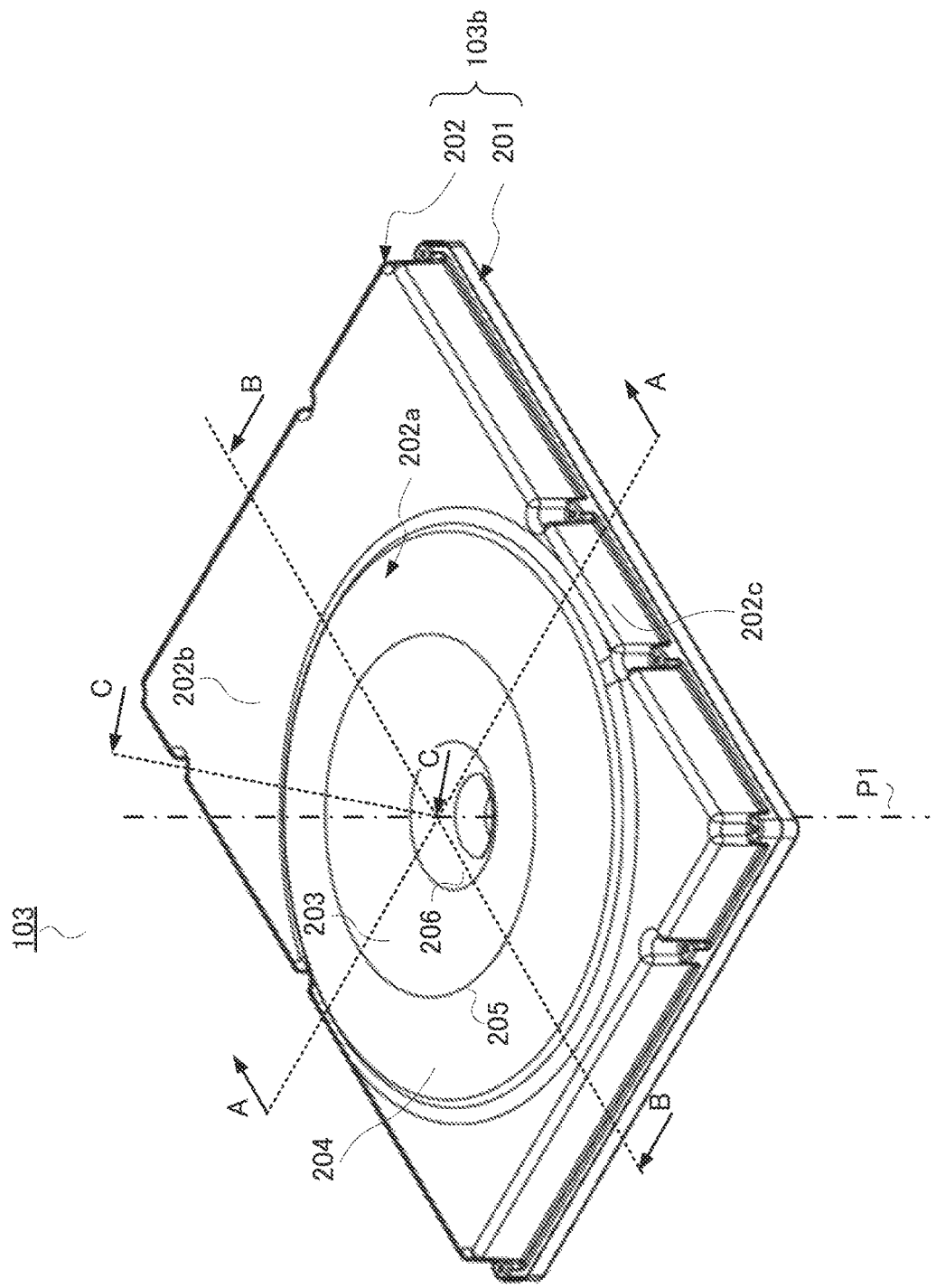
FIG. 2 is a perspective view of an electric supply section according to Embodiment 1 of the present invention.
Figure 3:
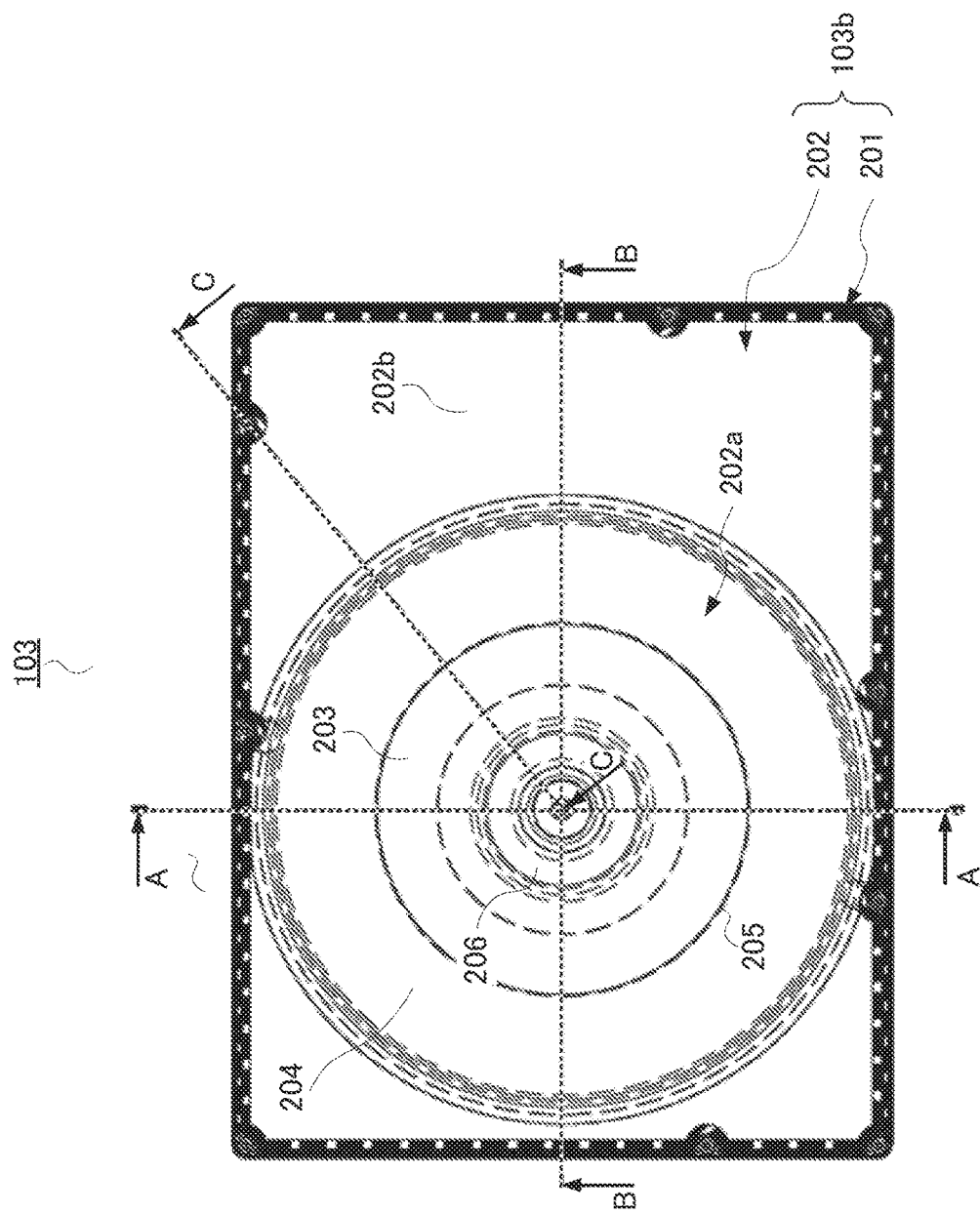
FIG. 3 is a plane view of FIG. 2.

FIG. 2 is a perspective view of electric supply section 103, and FIG. 3 is a plane view of electric supply section 103 viewed from the direction of electric reception section 153.

Figure 4:
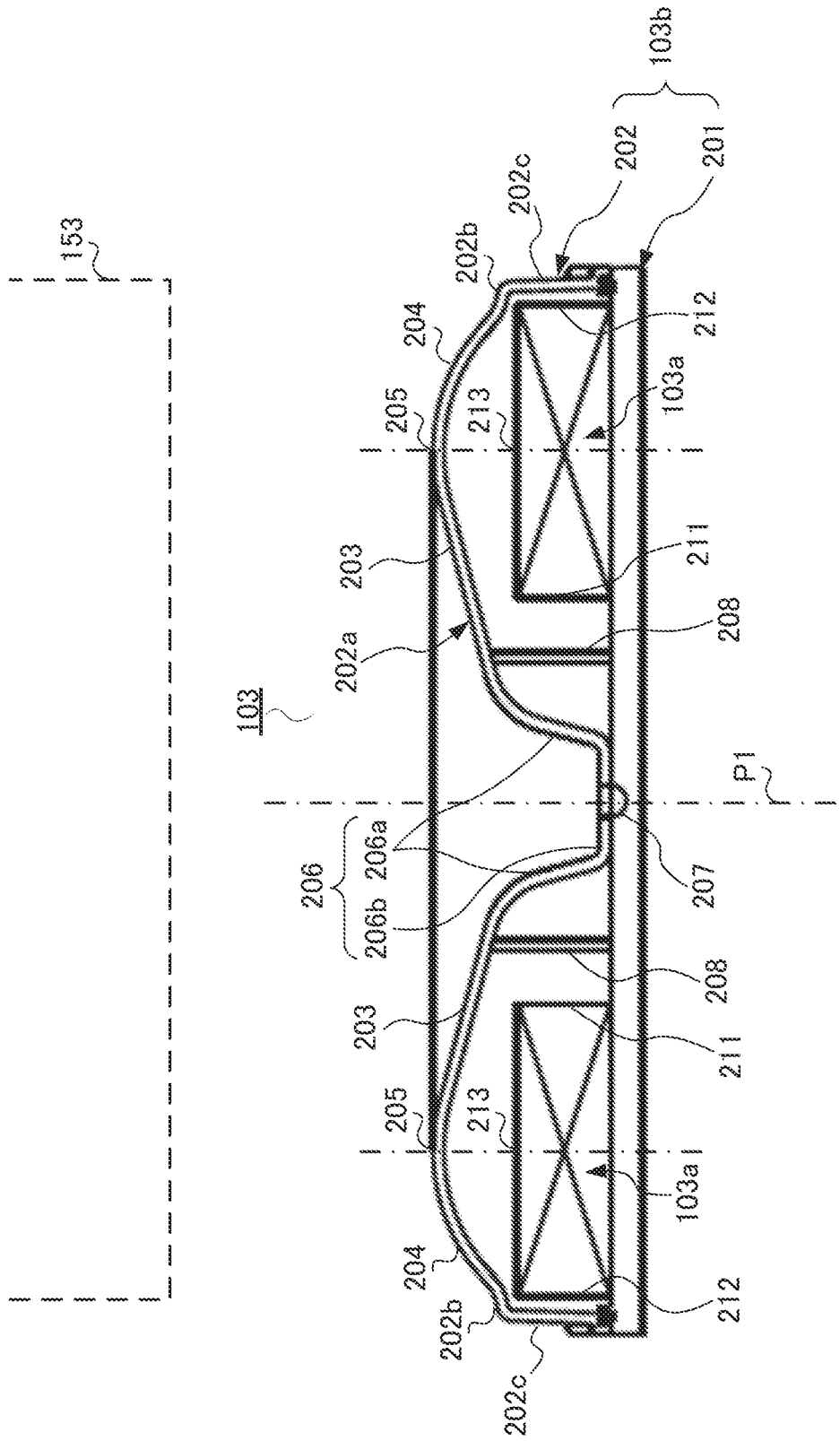
FIG. 4 is a sectional view taken along line A-A in FIG. 2.
Figure 5:
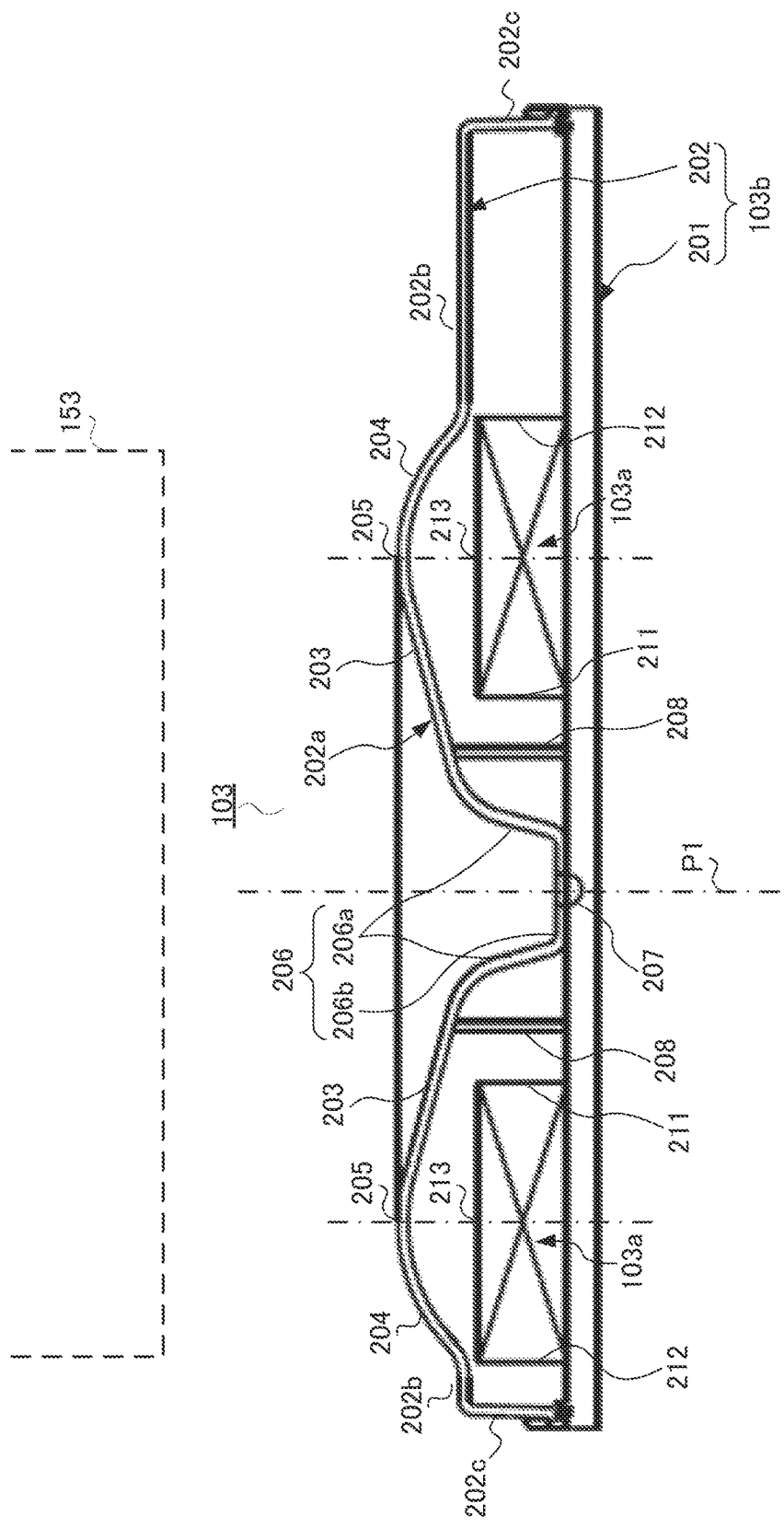
FIG. 5 is a sectional view taken along line B-B in FIG. 2.
Figure 6:
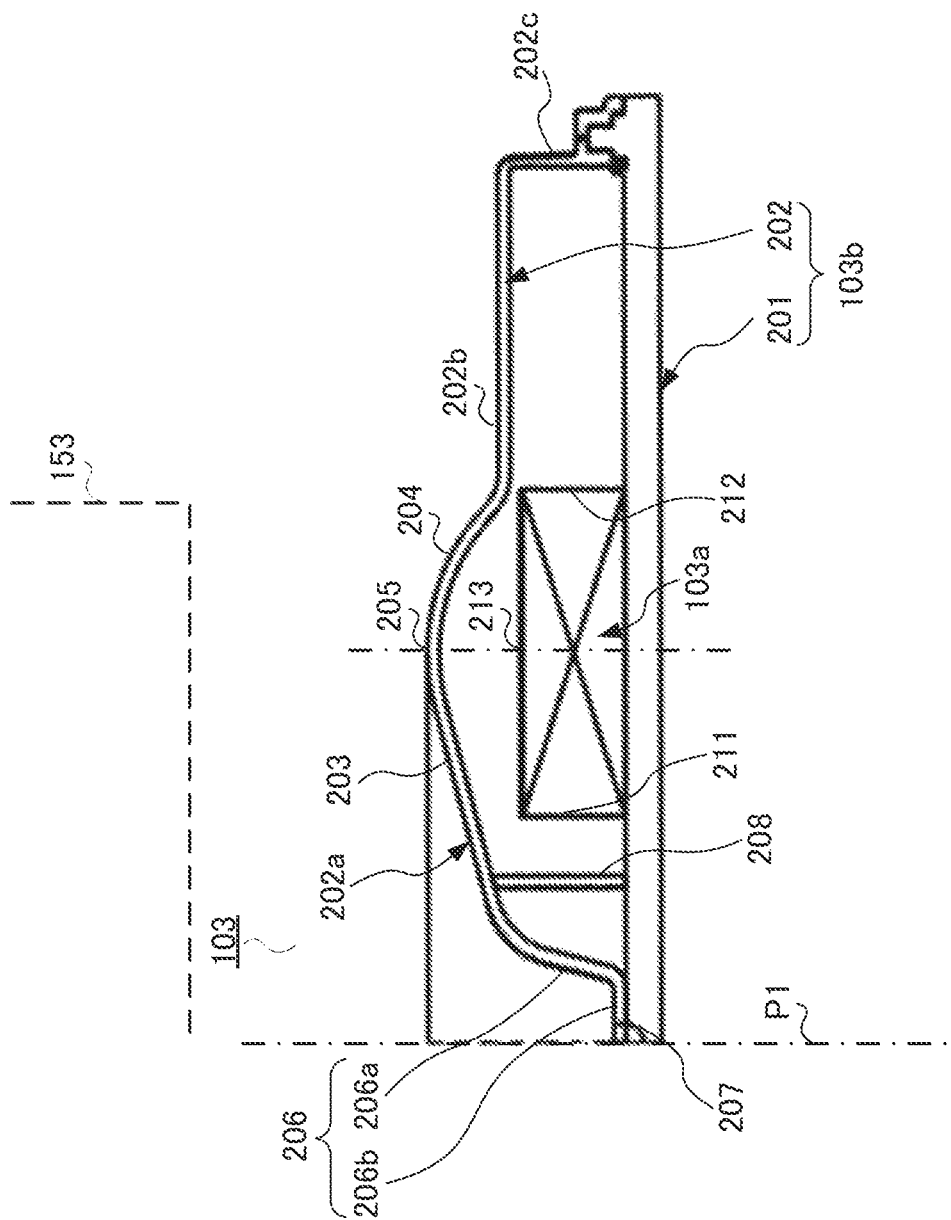
FIG. 6 is a sectional view taken along line C-C in FIG. 2.

FIG. 4 is a sectional view taken along line A-A in FIG. 2, FIG. 5 is a sectional view taken along line B-B in FIG. 2, and FIG. 6 is a sectional view taken along line C-C in FIG. 2. Hereinafter, the configuration of electric supply section 103 will be described mainly with reference to FIG. 2 and FIG. 4.

Electric supply section 103 includes electric supply coil 103a and casing 103b.

Electric supply coil 103a is of a hollow ring shape and placed on inner bottom surface (base) 201 of casing 103b. Electric supply coil 103a is connected, for example, to a commercial power source and supplies electric power to electric reception section 153 by supplying a current from this power source. Electric supply coil 103a is formed, for example, by winding a metallic thin wire.

Casing 103b includes base 201 and cover 202. Base 201 is formed, for example, in a square flat plate shape (for example, see FIG. 3). Base 201 is formed of a material, such as aluminum. Electric supply coil 103a is placed on base 201, and cover 202 is attached to base 201.

Cover 202 is formed of, for example, a nonmetallic material, such as a reinforced plastic. Cover 202 includes upper surface 202a that is a surface facing electric reception section 153 in casing 103b, flat portion 202b that is a portion other than upper surface 202a in the surface facing electric reception section 153 in casing 103b, and outer wall portion 202c that is the side portion of cover 202. When cover 202 is attached to base 201, casing 103b has first incline portion 203, second incline portion 204, and recessed portion 206 on upper surface 202a. More specifically, casing 103b has first incline portion 203 and second incline portion 204 in a portion on which electric supply coil 103a is projected when electric supply coil 103a is projected on casing 103b toward electric reception section 153 on upper surface 202a.

First incline portion 203 is formed so as to incline downward from circular top portion 205 toward inner edge portion 211 of electric supply coil 103a in the radial direction of electric supply coil 103a, i.e., so as to incline while gradually approaching electric supply coil 103a. Herein, the radial direction of electric supply coil 103a is a direction orthogonal to central axis P1 of electric supply coil 103a. First incline portion 203 is formed so as to have one end connected to top portion 205 and the other end connected to recessed portion 206 (side portion 206a).

Second incline portion 204 is formed so as to incline downward from circular top portion 205 toward outer circumference 212 of electric supply coil 103a in the radial direction of electric supply coil 103a, i.e., so as to incline while gradually approaching electric supply coil 103a. Second incline portion 204 is formed so as to have one end connected to top portion 205 and the other end connected to flat portion 202b.

Recessed portion 206 is placed at a position corresponding to the hollow portion of electric supply coil 103a. Recessed portion 206 is formed so as to have side portion 206a connected to first incline portion 203 and bottom portion 206b that faces and is connected to base 201.

Trench 207 is formed at bottom portion 206b of recessed portion 206. Trench 207 is provided for housing a foreign object sliding down from first incline portion 203. Trench 207 may have a shape capable of housing a foreign object and preventing a human finger or the like from touching the housed foreign object.

Reinforcement member 208 supports first incline portion 203. Reinforcement member 208 is formed, for example, of an insulator. This can secure the withstand load when the tires of vehicle 150 pass on casing 103b.

<Advantageous Effect of Present Embodiment>

In the present embodiment, two incline portions formed on upper surface 202a of casing 103b, i.e., first incline portion 203 that gradually approaches electric supply coil 103a toward the center of electric supply coil 103a and second incline portion 204 that gradually approaches electric supply coil 103a toward outer circumference 212 of electric supply coil 103a in the radial direction of electric supply coil 103a. Thereby, a foreign object on first incline portion 203 slides down to recessed portion 206 provided in the center portion of electric supply section 103. In this configuration, recessed portion 206 corresponds to the hollow portion of electric supply coil 103a, as described above. Meanwhile, heat generation of a foreign object in recessed portion 206 is small in comparison with that in the vicinity of electric supply coil 103a. As a result, a foreign object on first incline portion 203 slides down to recessed portion 206 and can therefore be prevented from being heated to a high temperature. A foreign object on second incline portion 204 also slides down to the exterior of electric supply section 103 and can therefore be prevented from being heated to a high temperature.

Moreover, in the present embodiment, the two incline portions, i.e., first incline portion 203 and second incline portion 204 are formed in a portion of casing 103b of electric supply section 103, the portion facing electric reception section 153. Generally, in the present embodiment, large electric power is supplied to electric reception section 153 at the bottom portion of vehicle 150, so that the shape of electric supply coil 103a becomes large, and casing 103b of electric supply section 103 cannot be provided with a sufficient curved surface due to the relation with the clearance between electric supply section 103 and the bottom portion of vehicle 150. With regard to this problem, according to the present embodiment, forming the two incline portions in a portion of casing 103b, which faces electric reception section 153, allows for a reduction in the thicknesses of the incline portions (first incline portion 203 and second incline portion 204) in comparison with the case of forming one incline portion in a portion of casing 103b, which faces electric reception section 153. Therefore, the height of electric supply section 103 toward the bottom surface of vehicle 150 can be reduced to thereby maintain the clearance between electric supply section 103 and the bottom portion of vehicle 150.

In the present embodiment, as illustrated in FIG. 4, it is preferable that top portion 205 on casing 103b be located at intermediate position 213 between inner edge portion 211 and outer circumference 212 of electric supply coil 103a in the direction of central axis P1 of electric supply coil 103a. This is because a foreign object at a position corresponding to intermediate position 213 in the radial direction of electric supply coil 103a is heated most readily. Locating top portion 205 that is most distant from electric supply coil 103a in the direction of central axis P1 on casing 103b at a position corresponding to the intermediate position 213 where a foreign object is heated most readily allows for minimizing heat generation of the foreign object even when the foreign object remains without sliding down.

Moreover, in the present embodiment, first incline portion 203 and second incline portion 204 may be covered with a protective cover coated with a material having a frictional coefficient less than a predetermined value. For example, the predetermined value may be set to approximately a value that makes a foreign object on each incline portion slidable. This enables a foreign object to readily slide on first incline portion 203 and second incline portion 204 and to surely slide down to recessed portion 206 or to the exterior of electric supply section 103.

In the above-described embodiment, a through-hole may be provided at bottom portion 206b of recessed portion 206 instead of trench 207. The through-hole is provided for ejecting a foreign object sliding down from first incline portion 203 to the exterior.

Moreover, in electric supply section 103 according to the above-described embodiment, recessed portion 206 may be provided with a distributing water pipe for discharging water. This can prevent water from accumulating in recessed portion 206.

The disclosure of the specification, drawings, and abstract in Japanese Patent Application No. 2012-073709 filed on Mar. 28, 2012, is incorporated herein by reference in its entirety.

INDUSTRIAL APPLICABILITY

An electric supply apparatus according to the present invention is suitable for contactlessly supplying electric power to an electric reception section provided in a vehicle.

REFERENCE SIGNS LIST

103 Electric supply section
103a Electric supply coil
103b Casing
153 Electric reception section
201 Base
202 Cover
202a upper surface
202b Flat portion
202c Outer wall portion
203 First incline portion
204 Second incline portion
205 Top portion
206 Recessed portion
207 Trench
208 Reinforcement member
211 Inner edge portion
212 Outer circumference
213 Intermediate position

The invention claimed is:

1. An electric supply apparatus that contactlessly supplies electric power to an electric reception section provided in a vehicle, the apparatus comprising:
   an electric supply coil configured to face the electric reception section and supply electric power to the electric reception section, the electricity supply coil having a ring shape, an in-edge, an out-edge, and a middle portion, the in-edge being adjacent to a hollow portion of the ring shape in a radial direction of the electricity supply coil, the out-edge being outer than the in-edge in the radial direction, the middle portion being between the in-edge and the out-edge in the radial direction; and
   a casing which houses the electricity supply coil, the casing having a first surface configured to face the electricity reception section and a second surface on which the electricity supply coil is located,
   wherein
   the first surface has an inclined portion with a first region and a second region, the first region overlapping at least a part of the middle portion of the electricity supply coil in a center axis direction of the electricity supply coil, the second region overlapping at least a part of the hollow portion of the ring shape of the electricity supply coil in the center axis direction, and wherein a first distance between the first region of the inclined portion of the first surface and the second surface is larger than a thickness of the electricity supply coil at the in-edge in the center axis direction, and a second distance between the second region of the inclined portion of the first surface and the second surface is smaller than the thickness of the electricity supply coil at the in-edge in the center axis direction.

2. The electric supply apparatus according to claim 1, wherein the first region is located at an intermediate position between an inner edge portion of the electric supply coil and an outer circumference of the electric supply coil in a direction of a central axis of the electric supply coil.

3. The electric supply apparatus according to claim 1, wherein the inclined portion includes a surface covered with a material having a frictional coefficient less than a predetermined value.

4. The electric supply apparatus according to claim 1, further comprising a trench formed in a recessed portion on the first surface of the casing, said trench being configured to house a foreign object sliding down from the inclined portion.

5. The electric supply apparatus according to claim 1, further comprising a reinforcement member that supports the inclined portion.

* * * * *